UNITED STATES PATENT OFFICE.

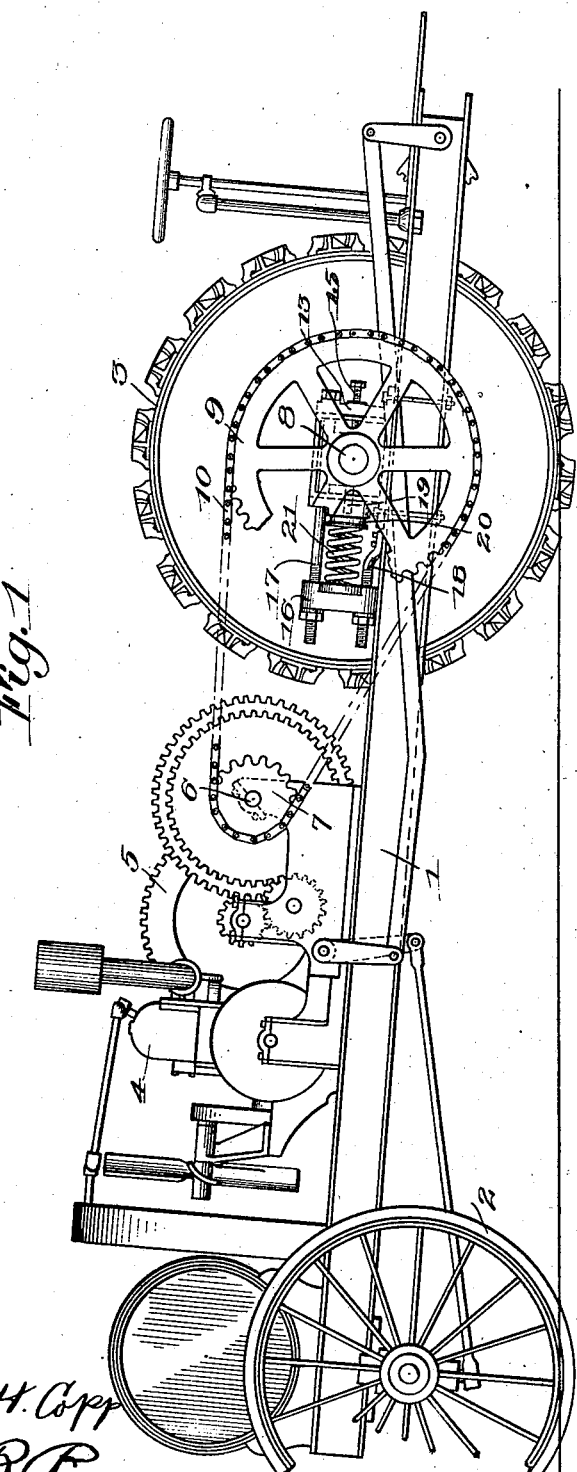

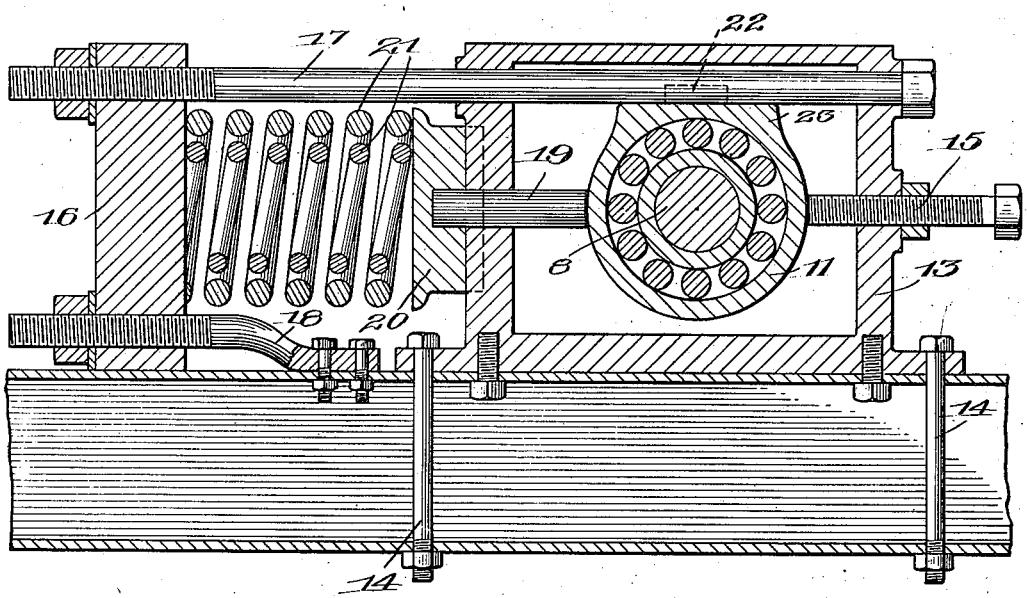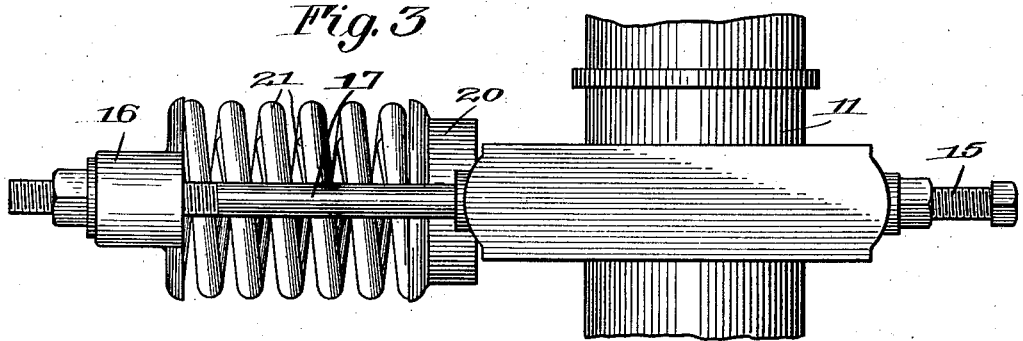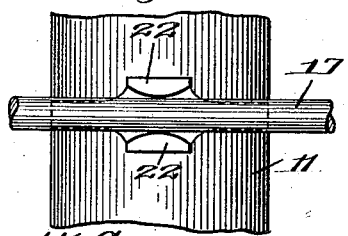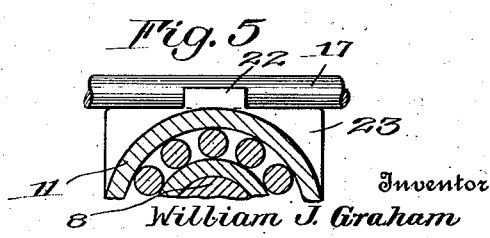

WILLIAM J. GRAHAM, OF ROCHESTER, NEW YORK, ASSIGNOR, BY MESNE ASSIGNMENTS, TO JOSEPH W. GRAY, OF MINNEAPOLIS, MINNESOTA.

BEARING.

1,188,358.  Specification of Letters Patent.  Patented June 20, 1916.

Application filed December 20, 1913. Serial No. 807,822.

*To all whom it may concern:*

Be it known that I, WILLIAM J. GRAHAM, of Rochester, in the county of Monroe and State of New York, have invented certain new and useful Improvements in Bearings; and I do hereby declare the following to be a full, clear, and exact description of the same, reference being had to the accompanying drawings, forming a part of this specification, and to the reference-numerals marked thereon.

My invention relates to bearings, with reference particularly to the bearings of axles for vehicles such as tractors, and it has for its object to provide a bearing of simple construction that can be successfully used upon the axle of a tractor of the type embodying a single traction wheel.

Another object of the invention consists in providing a bearing which enables the axle to shift its position relatively to the frame of the machine by sliding either at one or both ends, when the wheel comes in contact with uneven surfaces of the ground or when subjected to irregular or uneven loads or stresses, while at the same time maintaining a sufficiently rigid connection to afford the necessary traction for driving the machine.

Still another object of my improvement resides in the provision of means whereby the traction wheel may be driven from each end by means of sprocket chains, and in such a manner as to maintain an equal tension on the chains under all conditions, whereby the amount of wear on the parts is considerably decreased and the efficiency of the machine is greatly enhanced.

To these and other ends the invention consists in certain improvements and combinations of parts, all as will be hereinafter more fully described, the novel features being pointed out in the claims at the end of the specification.

In the drawings: Figure 1 is a side elevation of a tractor equipped with a preferred embodiment of my invention; Fig. 2 is a vertical sectional view taken centrally through one of the bearings; Fig. 3 is a plan view of the same; Fig. 4 is a detail plan view of a portion of one of the journal boxes, and Fig. 5 is a vertical sectional view, with parts broken away, taken centrally of Fig. 4.

Similar reference numerals throughout the several figures indicate the same parts.

In the tractor illustrated in the present embodiment, 1 designates the frame, while 2 are the front or steering wheels, and 3 is the single traction wheel located at the rear of the machine and supported on the frame in the manner which will be described presently.

4 is the engine and 5 represents, generally, the transmission gearing which embodies a jack shaft 6 having sprocket wheels 7 fixed thereon at its opposite ends. The rear wheel 3 has secured thereto the axle 8 upon which are carried the sprocket wheels 9, while 10 are sprocket chains leading from the sprockets 7 to the sprockets 9 to effect driving of the rear traction wheel.

It frequently happens that in passing over rough ground and when the tractor is subjected to quickly changing loads, or jarring and jolting, the traction wheel 3 will have a tendency to move forwardly or backwardly at one end or the other with relation to the frame, and it is desirable to permit sufficient freedom of movement of the axle relatively to the frame to provide for such conditions whereby the wheel may follow the ground closely, and the axle will yield with the load and return quickly to its normal position. To this end, I mount the axle 8 in boxes 11, arranged within the housing 13, the latter being attached to the frame 1 in any suitable manner as by means of bolts 14. The boxes 11 are held against rearward movement by adjustable pins 15 secured in the housings 13, and are retained in normal position by yieldable devices which permit their forward movement when necessary. To this end, abutments 16 are provided which are held in place by means of bolts 17 connecting them with the housings 13, and brackets 18 which are attached to the frame.

19 are pins movable in openings in the housings 13 and engaging the forward or front surfaces of the boxes 11. The pins 19 are mounted on heads 20, and 21 are springs disposed between the heads 20 and the abutments 16, which serve to force the pins 19 against the boxes 11 with sufficient pressure to retain the axle in normal position except against an unusual load. The boxes 11 are held against movement transversely of the frame of the machine by means of flanges 22 extending upwardly and supporting the bolts 17, but the adjacent surfaces of said flanges are curved, as shown in Fig. 4, whereby a slight relative rocking movement is permitted, so that the boxes may turn slightly on a vertical axis if necessary. Instead of using the bolts 17, I may employ any suitable means carried by the housings and resting on the boxes, whereby to support the frame. Movement of said boxes in a vertical plane, that is to say rotation upon their longitudinal axes, is prevented by means of the flanges or ribs 23 which are formed and positioned so as to engage the lower surfaces of the bolts 17.

From this construction, it will be apparent that while the frame of the tractor constantly holds substantially the same relative position above the ground over which it is traveling, the traction wheel at the rear may shift slightly in a direction forwardly, either at one or both ends to equalize the tension on the driving chains, the springs yielding under sudden changes of load, and acting quickly to cause the axle to resume its normal position, while at the same time the parts are so arranged as to maintain a sufficiently rigid connection between the traction wheel and the frame to insure driving the machine properly under the most adverse conditions, and without subjecting the parts to strain.

It will be understood that my invention is not to be limited to the precise arrangement herein described nor to a structure necessarily in which the traction wheel or drum is fixedly mounted on the axle, as the advantages set forth may be derived with equal facility from other embodiments of the invention whether the traction wheel is fixed on the axle while the latter rotates, or the parts are otherwise arranged, the essential purpose being to provide means permitting relative lateral movement between the frame and axle of the traction wheel of a tractor in which the power is imparted by a chain or equivalent drive.

I claim as my invention:

1. In a tractor, the combination with an axle and a wheel fixed thereon, of bearings for said axle, each embodying a housing, a box for the axle movably arranged in the housing, a member carried by the housing and engaging the upper surface of the box, lateral flanges formed on the box affording an extended surface engaging the bottom of said member, vertical flanges extending upwardly from the box engaging the sides of said member, the vertical flanges being curved to permit lateral relative movement of the member and box, an adjustable pin in the housing engaging the rear face of the box, and a pin engaging the front face of the box and held yieldably thereagainst.

2. In a tractor, the combination with an axle, of bearings for said axle, each embodying a housing, a box for the axle movably arranged in each housing, a member carried by the housing and engaging the upper surface of the box, which latter is provided with an extended surface engaging the bottom of said member and vertical flanges engaging the sides of said member, an adjustable device in the housing engaging the rear face of the box, and yieldable means engaging the front face thereof.

WILLIAM J. GRAHAM.

Witnesses:
H. E. STONEBRAKER,
RUSSELL B. GRIFFITH.